United States Patent [19]
Haas et al.

[11] Patent Number: 5,848,214
[45] Date of Patent: Dec. 8, 1998

[54] OPTICALLY-GUIDING MULTICHIP MODULE

[75] Inventors: Franz Haas, Rome; Paul R. Cook, Vernon, both of N.Y.

[73] Assignee: The United States of America as represented by the Secretary of the Air Force, Washington, D.C.

[21] Appl. No.: 895,095

[22] Filed: Jul. 16, 1997

[51] Int. Cl.$^6$ .................................................. G02B 6/04
[52] U.S. Cl. .............................. 385/120; 385/14; 385/115
[58] Field of Search ................................... 385/120, 115, 385/116, 14, 37, 15, 10; 359/15, 19, 34; 257/82, 98

[56] References Cited

U.S. PATENT DOCUMENTS 5,335,361  8/1994  Ghaem .................................. 257/98 X
5,638,469  6/1997  Feldman et al. ......................... 385/14

*Primary Examiner*—Phan T. H. Palmer
*Attorney, Agent, or Firm*—Harold L. Burstyn

[57] ABSTRACT

A Fiber Optic Plate is the substrate or part of the substrate in a multichip module. Multichip modules can be stacked to form layers of densely packed integrated circuit die. Optical signals carry data from one layer in the stack to one or more of the other multichip module layers or to peripheral devices physically separate from the stack. Data are transmitted at much greater speed by such optical signals than by traditional electronic interconnects. The Fiber Optic Plate guides the optical signals, minimizing signal crosstalk and allowing for many optical signals to occupy a small area on the module. A Fiber Optic Plate as all or part of the multichip module also provides a means to accurately align the individual modules in a stack.

17 Claims, 6 Drawing Sheets

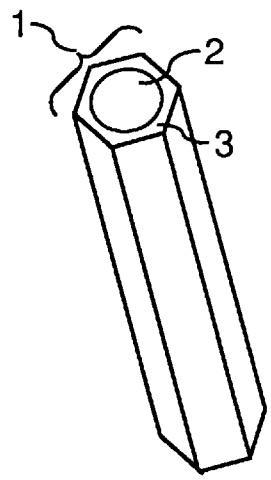
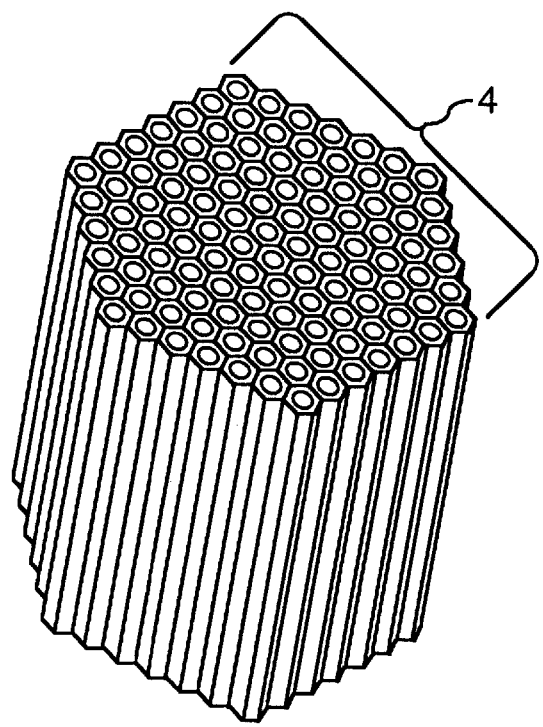
FIG. 1A    FIG. 1B
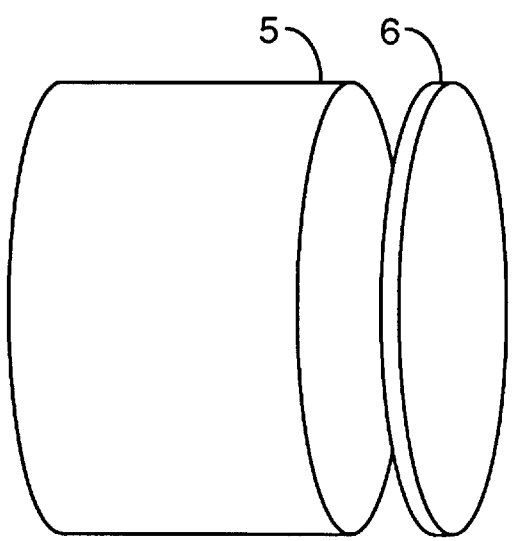
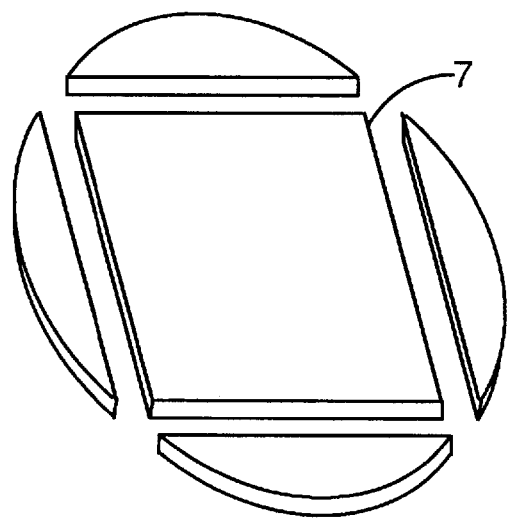
FIG. 1C    FIG. 1D

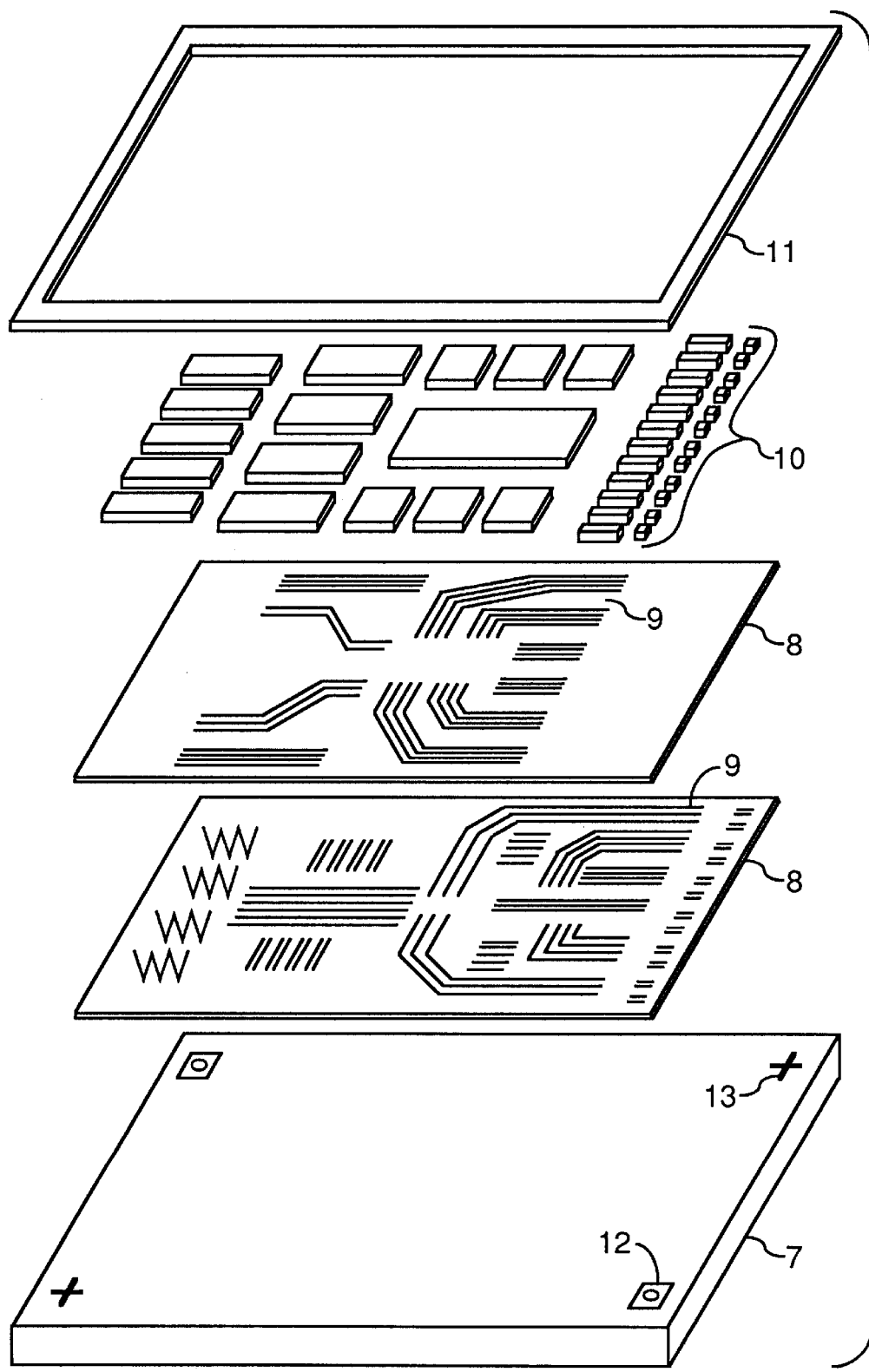

OPTICALLY-GUIDING MULTICHIP MODULE

STATEMENT OF GOVERNMENT INTEREST

The invention described herein may be manufactured and used by or for the Government for governmental purposes without the payment of any royalty thereon.

BACKGROUND OF THE INVENTION

The present invention relates to the use of light as a medium for transmitting information between circuit components inside a computer, and, in particular, to optical interconnect architectures that overcome the drawbacks of wire interconnects.

Using light in place of electrical signals propagated down wires increases the number, density, and speed of data transmitted, leading to advances in the operating speed and processing power of computer systems. However, implementing optical interconnects in computer systems has been slow. Currently available hybrid electro-optical computer systems lack both an adequate means of controlling the propagation of the light between circuit components and an efficient means of aligning components.

The limits of electrical interconnects are well documented. Wires take up too much space. They cannot be close to one another without cross-coupling electronic signals. And they have a characteristic capacitance that limits the rate of data transfer. As integrated circuits become faster and computers smaller, the interconnects limit the performance of the system.

The interconnect from one computer board to another is a critical communications bottleneck in a computer system. Multichip modules ("MCMs") have solved the problem of transmitting electronic signals on a single computer board efficiently and rapidly. MCMs place bare integrated circuit dies next to each other to reduce the distance that electronic signals must travel. However, when a complete computer system is formed by stacking a number of MCMs together, the transmission of signals between the MCMs is limited by the number, density, and data rate of the wires that form the data paths.

Optical interconnect architectures have been proposed to address this problem of transmitting data board-to-board. An optical interconnect architecture has to: (1) propagate the optical signals from one board to another in a controlled manner; (2) insure that the light in one data path does not end up in another at the receiving board, thereby confusing the transmitted signals; (3) transmit enough light to the receiving board to discern the data transmitted; (4) provide for aligning the boards during construction; and (5) maintain that alignment through cycles of vibration and heating.

A typical optical interconnect scheme comprises optical emitters, photodetectors, and either a fiber-optic cable or a lens system that is refractive, diffractive, or holographic. Either a single high-speed emitter and detector or a plurality of slower emitters and detectors is located on each board.

In interconnects based on fiber-optic cable, the cable is approximately the same size as the wires in traditional board-to-board interconnects. High-speed optical emitters and detectors have data rates superior to electronic interconnects. The drawbacks of fiber-optic interconnects are that (1) only a small number of data channels is possible because the fiber, collecting optics, and multiplexing and demultiplexing circuitry require a large area, and (2) high-speed electro-optic devices, complex optics, and system alignment cost too much.

In lens-based optical interconnects a lens system collects the light emitted from one board and focuses it onto detectors on another board. In some designs more than one lens collects the optical signals and redirects them between boards. The resulting architecture is expensive to manufacture. Its components are extremely hard to align and susceptible to misalignment from jarring or thermal expansion of any element. Though lens-based interconnects have advantages in density and number of interconnects over electronic and fiber-based interconnects, their high cost and complexity have kept them from being commercialized.

Thus there exists a need for apparatus to transmit and a method of transmitting optical signals from one computer board to another that permits easy alignment and is less costly than present techniques.

SUMMARY OF THE INVENTION

Therefore, one object of the present invention is to provide a novel apparatus and method for controlling the propagation of optical signals between MCMs and aligning one module with another.

Another object of the present invention is to provide a novel apparatus and method for controlling the propagation of optical signals between MCMs that offer a low-cost, high-performance optical interconnect medium.

A further object of the present invention is to integrate optically guiding material into the support structure of a computer system that employs MCMs, thereby avoiding the cost and complexity of adding a lens or fiber-optic guiding system.

Still a further object of the present invention is to reduce in complexity the entire multichip module-to-module packaging step. As the interconnects are established once the MCMs are aligned, the apparatus and method of the present invention lowers the cost of assembly and makes the computer system smaller while increasing the number, density, and data rates per channel of the multichip module-to-module interconnect.

The Fiber Optic Plate ("FOP") MCM of the present invention enhances the number, density, and data rate of and reduces the physical area required for module-to-module interconnects compared to traditional electronic wire-based interconnects. The present invention offers cost, complexity, and alignment advantages over the optical interconnect solutions of the prior art.

The FOP MCM of the present invention is populated with integrated circuit chips in addition to electro-optic chips that contain a multitude of emitters and detectors configured to transmit and receive light vertically up (facing away from the module) and down (facing into the module). Alignment marks located on the FOP material enable the alignment mark on one module to be viewed through the next module being aligned. The alignment process can be aided by an optical source viewed through the optical guiding material. Manual or active alignment can be aided by a position-sensitive optical detector, which indicates the direction of misalignment.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1A shows a single optical fiber consisting of a central core and an outer cladding layer.

FIG. 1B shows the stacking of optical fibers, an intermediate step in the forming of a FOP.

FIG. 1C shows a complete cylinder of fiber optic material with a circular section cut from the cylinder.

FIG. 1D shows the cutting of fiber optic material into a form that can be a MCM or part of a MCM.

FIG. 2A shows an exploded view of a MCM.

DESCRIPTION OF THE PREFERRED EMBODIMENT

Figure 2B:
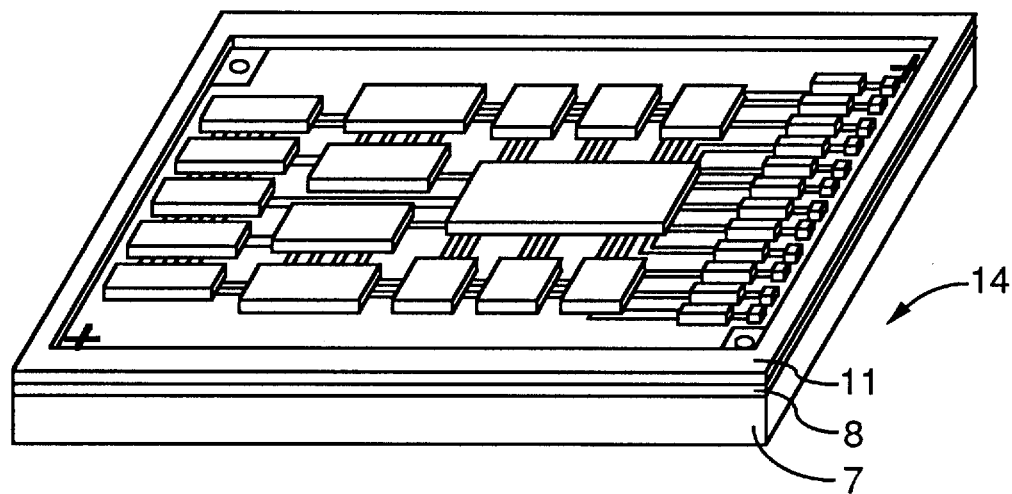
FIG. 2B shows a single MCM.

Referring to FIGS. 1A through 1D, a FOP 7 is comprised of a plurality of optical fibers 1. Each optical fiber 1 is comprised of an inner core 2 and an outer cladding 3. The index of refraction of inner core 2 differs from that of outer cladding 3 by an amount sufficient to confine light within inner core 2.

FOP 7 is optically transparent and guides optical signals along a single axis. FOP 7 is fabricated by collecting a plurality of optical fibers 4. Plurality of optical fibers 4 is heated and stretched so that the individual optical fibers 1 bond together and are drawn to a smaller size such that the inner core 2 of each has a diameter of approximately 6 to 10 microns. A bonded fiber bundle 5 that results is sliced crosswise into a plurality of wafers 6. Each wafer 6 can be sawed into a form of any desired thickness, width, or length. FIGS. 1A–D show the progression from single fiber 1 to square FOP 7 of the size and shape appropriate to a MCM substrate. A smaller section can be cut and inserted into a multichip module substrate of another material. An optical image incident on one side of FOP 7 will be translated through the many fibers to the other side of the plate with negligible distortion.

Figure 2C:
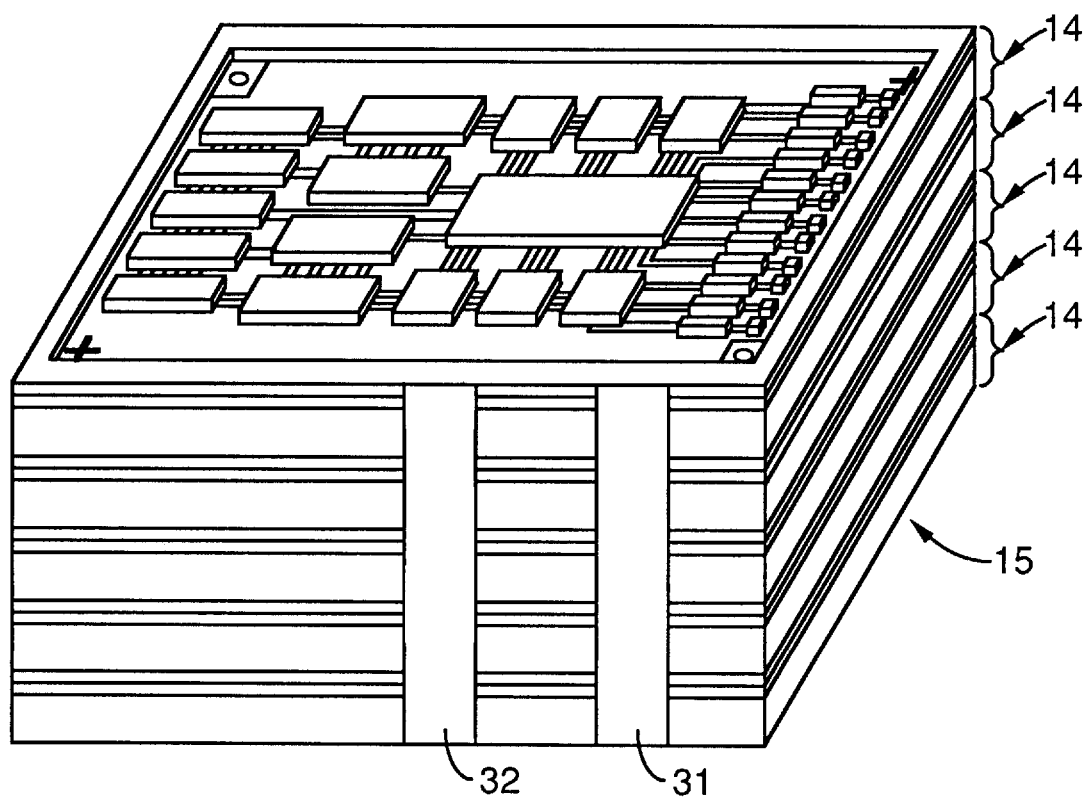
FIG. 2C shows a stack of five MCMs.
Figure 2D:
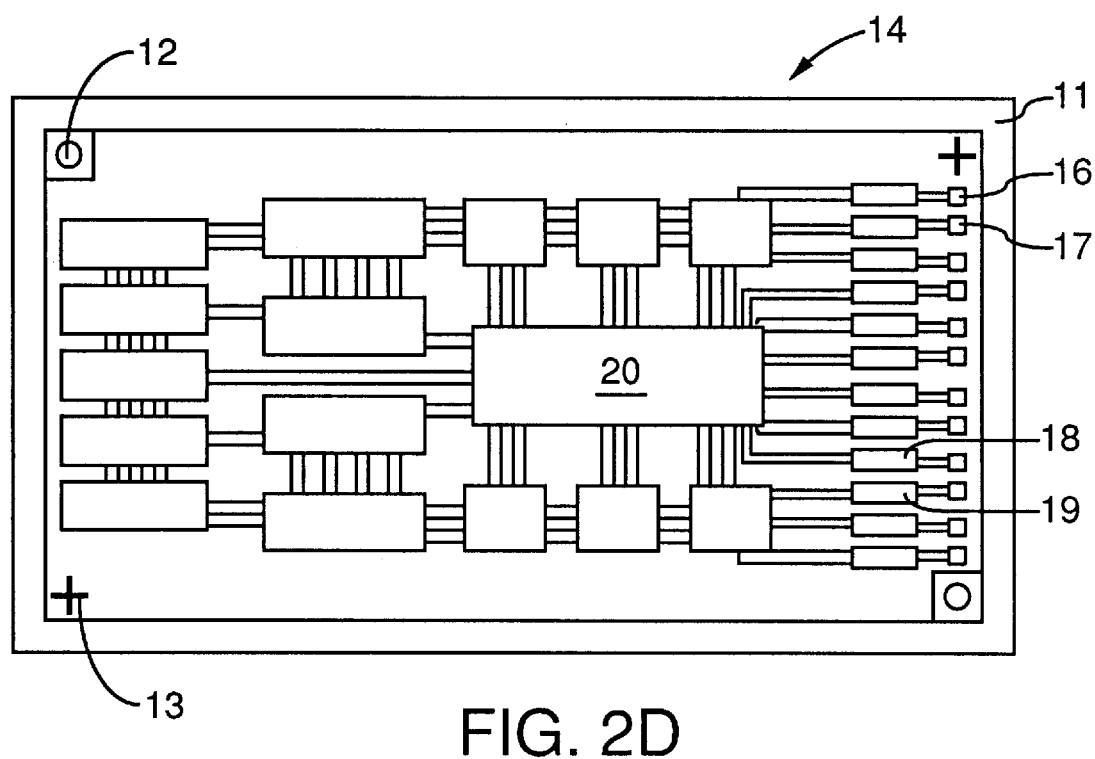
FIG. 2D is a top view of a MCM showing individual components.

Referring to FIGS. 2A–2D, in the optical interconnect scheme of the present invention, FOP 7 is either the entire support structure for a plurality of integrated circuit chip layers 10 or a part of their support structure. FIG. 2A is an exploded view of the individual components that comprise a single FOP MCM 14. FIG. 2B shows single FOP MCM 14 as assembled. FIG. 2C shows a stack 15 made of individual FOP MCMs 14. FIG. 2D is a top view of single FOP MCM 14.

Referring to FIGS. 2A and 2C, each single FOP MCM 14 of stack 15 is in turn a stack comprised of integrated circuit chip layer 10 and a spacer 11 mounted on electronic interconnection layers 8, all mounted on FOP 7. A plurality of electronic interconnects 9 (wires) provides data paths between integrated circuit chip layer 10 within a single FOP MCM 14. Electronic interconnection layers 8 must either be thin and transparent to optical signals or have holes that optical signals pass through. Referring again to FIG. 2C, stack 15 of single FOP MCMs 14 has a positive voltage connection 31 and a ground connection 32 that run down the side of stack 15 to supply integrated circuit chip layers 10 with electrical power. Positive voltage connection 31 and ground connection 32 can be connected to external power supplies via pressure or solder contacts. Other ways to supply power are also feasible.

FIG. 2D shows one possible layout of integrated circuit chip layers 10 on single FOP MCM 14. An integrated circuit chip 20 is surrounded by support chips including a driver chip 19 required to drive an optical emitter chip 17 that sends data from one single FOP MCM 14 to another. A chip containing at least one optical detector 16 receives optical signals from other single FOP MCMs 14 in stack 15 and sends these signals to an amplifier chip 18, which transfers the appropriate signal to integrated circuit chip 20.

Figure 3A:
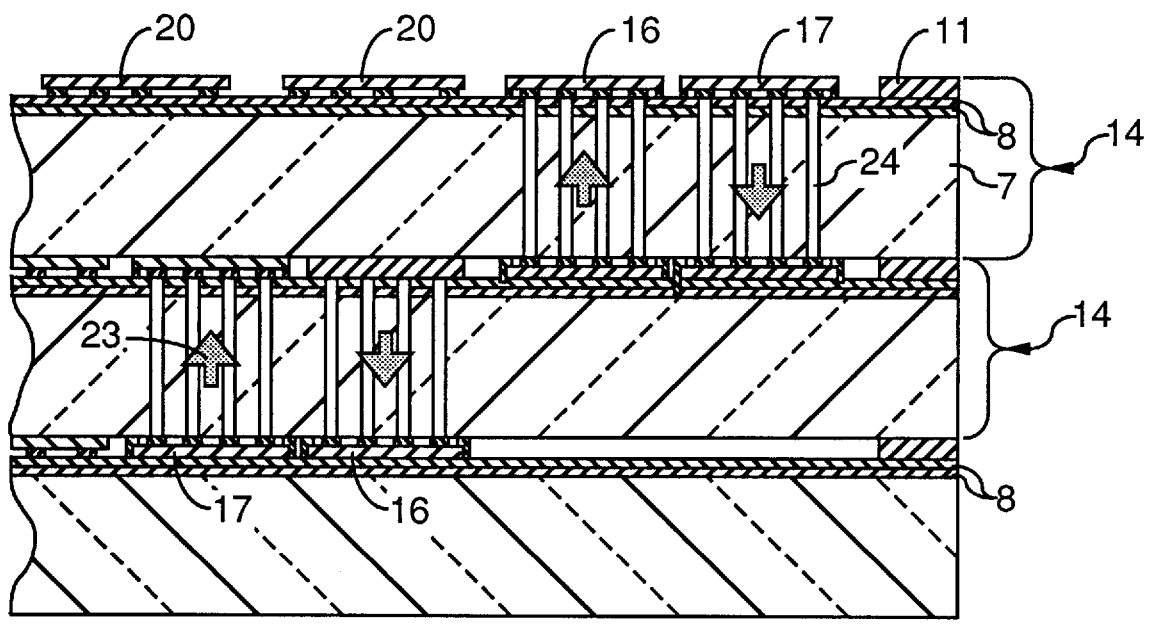
FIG. 3A shows a portion of a cross section of a stack of FOP MCMs.
Figure 3B:
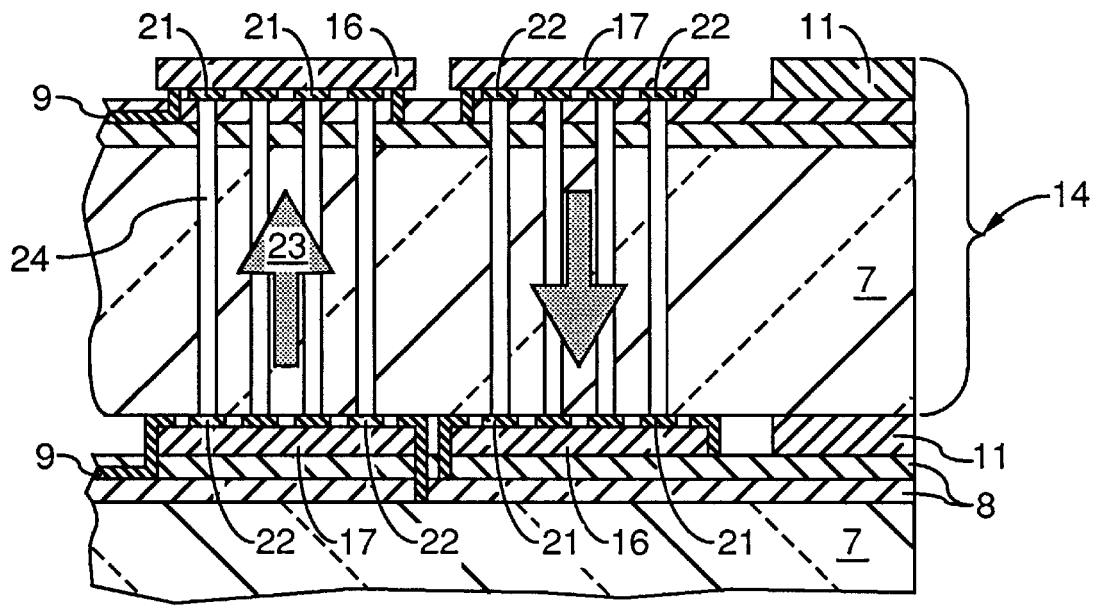
FIG. 3B is a close-up view of the up and down optical interconnects between two MCMs.

Referring to FIG. 3A, an optical data path connects three single FOP MCMs 14. Referring to FIG. 3B, a close up view of the top single FOP MCM 14 of FIG. 3A and part of the middle one shows in detail the components required to transmit optical signals. To transmit from a lower single FOP MCM 14 to a higher single FOP MCM 14 in stack 15 (see FIG. 2), a chip containing at least one optical emitter 17 is placed on lower single FOP MCM 14 with emission surfaces 22 facing up. A corresponding number of optical detectors 16 is placed on upper single FOP MCM 14 with detection surfaces 21 facing down. Upper single FOP MCM 14 is placed over lower single FOP MCM 14 and aligned thereto. Spacer 11 between the two modules insures their closest possible spacing while preventing pressure from being applied directly to integrated circuit chip layer 10 (not shown).

Referring again to FIG. 3B, to transmit from higher single FOP MCM 14 to lower single FOP MCM 14, place a chip having a plurality of optical detectors 16 with detection surfaces 21 facing up on lower single FOP MCM 14. Place a corresponding chip having a plurality of optical emitters 17 on upper single FOP MCM 14 with emission surfaces 22 facing down. Place upper single FOP MCM 14 over lower single FOP MCM 14 and align them. As in the above example, spacer 11 between the two modules insures the closest possible spacing of the two single FOP MCMs 14 while preventing pressure from being applied directly to integrated circuit chip layer 10 (not shown).

Referring again to FIGS. 3A and 3B, light incident on one surface of single FOP MCM 14, represented by a plurality of light beams 24, will be confined to the fiber cores that comprise single FOP MCM 14. This light will pass to the other side of single FOP MCM 14 without the divergence normally associated with light traveling through air or a uniform transparent medium. Each arrow 23 shows the direction of travel of light beams 24 that carry the optical signals guided by single FOP MCM 14. Emission surfaces 22 and detection surfaces 21 must be fabricated with the same spacing and configuration to insure their proper alignment to each other. The light from a single emission surface 22 will be incident on a single detection surface 21, thereby creating an optical data path.

Figure 4:
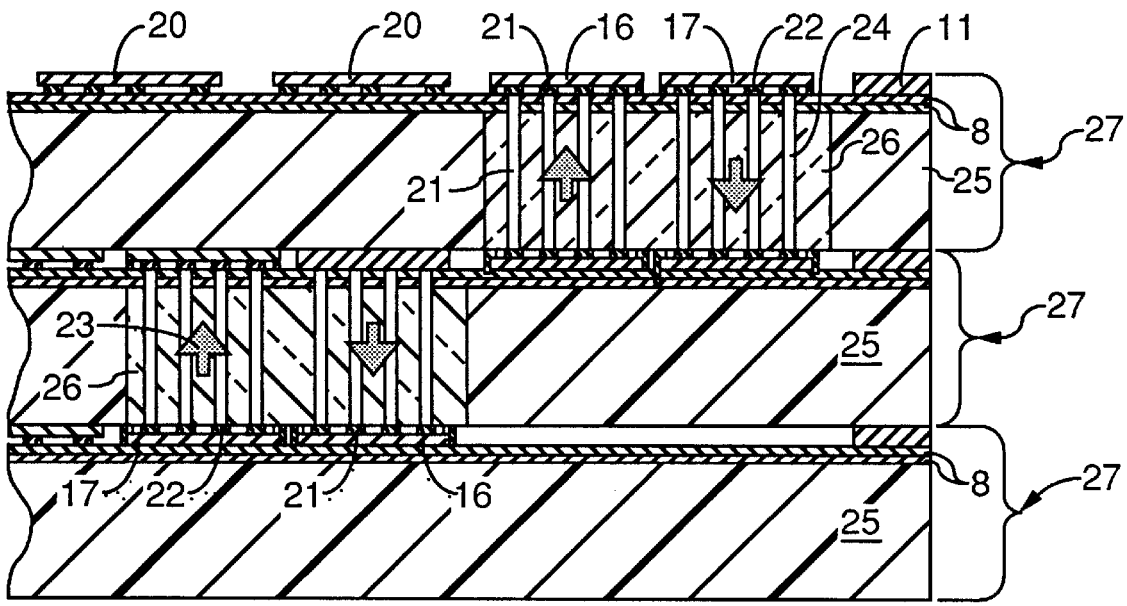
FIG. 4 shows a portion of a cross section of a MCM where FOP material is embedded only in areas required for module-to-module interconnects and alignment marks.

Referring to FIG. 4, in a second preferred embodiment of the present invention, there is an alternative to using FOP 7 (see FIGS. 1 and 2) as the entire single FOP MCM 14. Pieces 26 of an FOP can be embedded in areas of an MCM 27 that require optical guiding for optical interconnects or for the visualization of alignment marks through MCM 27. MCMs have been made of plastics, ceramics, fiberglass, and other materials, depending on the need for ease of fabrication, thermal transport, low cost, or other system-specific criteria. Embedding piece 26 in an alternative MCM substrate material 25 maintains the functionality of the alternative material while providing areas on the module optimized for optical interconnects.

An alternative to multilayered stack 15 of single FOP MCMs is a single layer of FOP material fabricated with other packaging technologies to provide an optical interconnect and/or system alignment capability. Systems requiring large amounts of data input and output with peripheral devices can use this technology to establish and align many optical interconnect signals from the system to the peripheral device. The interface thus established can also provide for transmitting information between two devices that must be physically and/or electrically isolated.

The present invention also eases the alignment of one single FOP MCM 14 to another. It is critical that a large number of light beams 24 generated on one single FOP MCM 14 reach the corresponding detection surfaces 21 on adjacent single FOP MCM 14 with little crosstalk between channels and substantially no light loss. The alignment must be within the capabilities of the system manufacturers without requiring precision alignment tools or expertise with their excessive cost.

Aligning two single FOP MCMs 14 is a two-step process. First, each integrated circuit chip layer 10 (see FIG. 2A) must be aligned to its respective single FOP MCM 14. Each integrated circuit chip layer 10 is aligned to a fixed reference point on single FOP MCM 14, such as an alignment mark 13 as shown in FIGS. 2A, 2D, and 5C.

Figure 5A:
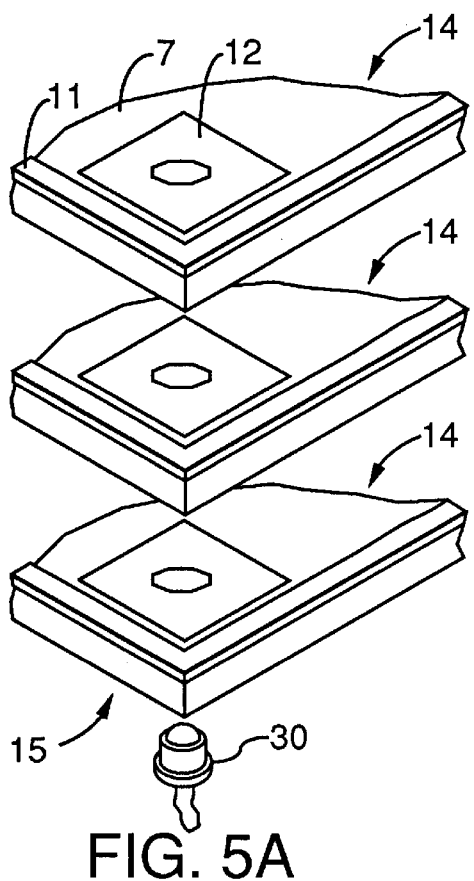
FIG. 5A is an exploded view of the corner section of three MCMs with a circular aperture and a light source for module-to-module alignment.
Figure 5B:
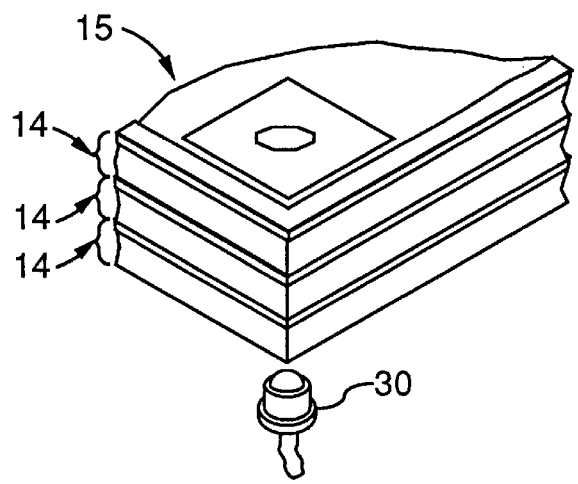
FIG. 5B is a view of three MCMs aligned using an external light source.

The second step is the alignment of one single FOP MCM 14 to another single FOP MCM 14. The transparency and optical guiding property of FOPs 7 make this step possible. FIGS. 5A, 5B, 5C, 5D and 5E, show three possible methods of alignment; they can be used independently or together. Referring to FIGS. 5A and 5B, a substantially circular aperture 12 is placed on each single FOP MCM 14. An external light source 30, shown here as a light-emitting diode (LED), is placed beneath the lowest single FOP MCM 14 in stack 15. Each higher single FOP MCM 14 is moved until a maximum amount of light emitted from circular aperture 12 indicates the optimal alignment of that single FOP MCM 14. This process is repeated for as many single FOP MCMs 14 as are in stack 15.

Figure 5D:
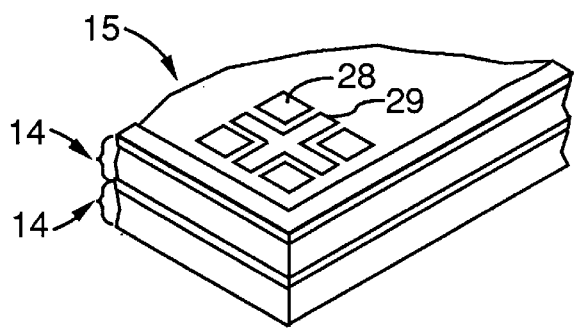
FIG. 5D shows two MCMs aligned using complementary alignment marks to illustrate that the image of the lower mark can be seen through the upper MCM.
Figure 5C:
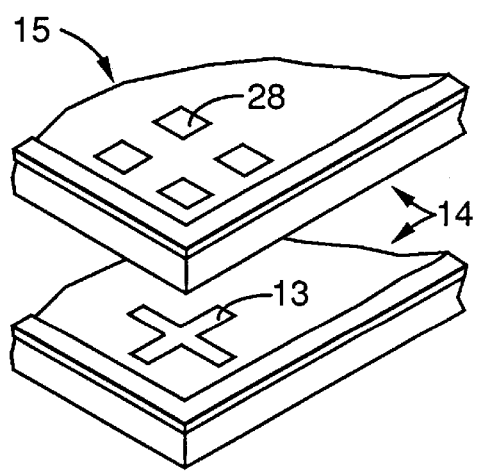
FIG. 5C is an exploded view of the corner section of two MCMs showing complementary alignment marks.

Referring to FIGS. 5C and 5D, the second method of alignment uses complementary alignment patterns on adjacent single FOP MCMs 14. Alignment mark 13 (e.g., a cross) is placed on one single FOP MCM 14 and a pattern of four squares 28 is placed on an adjacent single FOP MCM 14. An image 29 of alignment mark 13 can be viewed through the upper single FOP MCM 14 and accurately aligned to pattern of four squares 28.

Figure 5E:
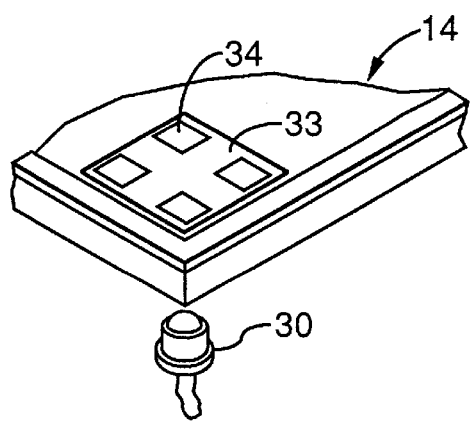
FIG. 5E shows a quadrant detector placed on a MCM where FOP material is embedded to align the MCM to an external reference light source.

Referring to FIG. 5E, the third method of alignment uses a position sensing optical detector, shown here as a quadrant detector 33 and external light source 30. Quadrant detector 33, located on the FOP material of a single FOP MCM 14, has four individual sensing areas 34. Computing, with respect to the center of quadrant detector 33, the position of the light spot emitted from external light source 30 requires comparing the outputs from each of the four individual sensing areas 34. The light spot emitted from external emitter 30 should be as small as possible but larger than the gap between the individual sensing areas 34.

Module-to-module alignment is limited only by the size of inner core 2 of FOP 7 (see FIG. 1), which limits the resolution of image 29. The typical core size of 6 to 10 microns provides much better alignment than current methods and is well within the requirements of the optical interconnect scheme of the present invention.

Clearly many modifications and variations of the present invention are possible in light of the above teachings. It should therefore be understood that, within the scope of the inventive concept, the invention may be practiced otherwise than as specifically claimed.

What is claimed is:

1. An optical interconnect apparatus, which comprises:
   at least one fiber optic plate incorporated into a first multichip module;
   said first multichip module being disposed so that an optical signal passes through said fiber optic plate, from an optical emitter disposed upon a second multichip module, to an optical detector disposed upon said first multichip module; and
   said optical emitter and said optical detector being aligned so that said optical signal passes between them with substantially no loss.

2. Apparatus as in claim 1, wherein said optical emitter and said optical detector are aligned by means effective for maximizing transmission of a light beam between said first and said second multichip modules.

3. Apparatus as in claim 2, wherein said means effective for maximizing transmission is a one of a light-emitting diode, a laser diode, a porous silicon light source, and incandescent light source, and a fluorescent light source.

4. Apparatus as in claim 1, wherein said optical emitter is aligned to a mark on said second multichip module;
   said optical detector is aligned to a mark on said first multichip module;
   said first and said second multichip modules are aligned to each other by means of a pair of complementary patterns;
   a first member of said pair is placed on said at least one fiber optic plate; and
   a second member of said pair is placed on said second multichip module.

5. Apparatus as in claim 1, wherein each of said two multichip modules includes at least one of said optical emitter and at least one of said optical detector disposed thereon.

6. A method of transmitting an optical signal between at least two multichip modules, said method comprising the steps of:
   incorporating at least one fiber optic plate into at least one of said at least two multichip modules;
   placing at least one optical emitter and at least one optical detector upon each of said at least two multichip modules; and
   aligning said at least one optical emitter with said at least one optical detector, whereby said optical signal is transmitted with substantially no loss between said at least two multichip modules.

7. The method of claim 6, wherein said step of aligning includes a step of maximizing transmission of a light beam between a first and a second of said at least two multichip modules.

8. The method of claim 7, wherein said step of maximizing includes a further step of using a one of a light-emitting diode, a laser diode, a porous silicon light source, and incandescent light source, and a fluorescent light source.

9. The method of claim 6, including the additional steps of repeating said steps of incorporating, placing, and aligning, whereby said optical signal is transmitted with substantially no loss through a plurality of said at least two multichip modules.

10. The method of claim 6, wherein said step of aligning includes placing a first member of a pair of complementary patterns on a first of said at least two multichip modules and a second member of said pair on a second of said at least two multichip modules.

11. Apparatus for transmitting an optical signal between at least two multichip modules, which comprises:

means for incorporating at least one fiber optic plate into at least one of said at least two multichip modules;

means for placing at least one optical emitter and at least one optical detector upon each of said fiber optic plates; and means for aligning said at least one optical emitter on a first of said at least two multichip modules with said at least one optical detector on a second of said at least two multichip modules, whereby said optical signal is transmitted with substantially no loss between said at least two multichip modules.

12. Apparatus as in claim 11, wherein said means for aligning includes means for maximizing transmission of a light beam between a first and a second of said at least two multichip modules.

13. Apparatus as in claim 12, wherein said means for maximizing includes a one of a light-emitting diode, a laser diode, a porous silicon light source, and incandescent light source, and a fluorescent light source.

14. Apparatus as in claim 11, further including means for repeating said steps of incorporating, placing, and aligning, whereby said optical signal is transmitted with substantially no loss through a plurality of said at least two multichip modules.

15. Apparatus as in claim 11, wherein said means for aligning includes a first member of a pair of complementary patterns placed on a first of said at least two multichip modules and a second member of said pair placed on a second of said at least two multichip modules.

16. Apparatus for aligning at least one multichip module, which comprises:

an external light source;

a fiber optic plate incorporated into each of said at least one multichip module;

said fiber optic plate having an aperture; and said external light source being disposed so that, when said at least one multichip module is aligned, the amount of light emitted from said external light source that passes through said aperture is maximized.

17. Apparatus for aligning at least one multichip module, which comprises:

an external light source;

a fiber optic plate incorporated into said at least one multichip module;

at least one position-sensing optical detector placed on said fiber optic plate; and said external light source and said at least one position-sensing optical detector being disposed so that, said at least one position-sensing optical detector emits an electrical signal that indicates when said at least one multichip module is aligned with said external light source.

* * * * *